United States Patent Office 3,594,472
Patented July 20, 1971

3,594,472
ASPIRIN SOLUBILIZING AGENT AND METHOD FOR PREPARING SAME
Samuel W. Sopp, San Mateo, Calif., and Jack R. Anderson, Ridgewood, N.Y., assignors to Merck & Co., Inc., Rahway, N.J.
No Drawing. Continuation-in-part of application Ser. No. 651,687, July 7, 1967. This application June 17, 1968, Ser. No. 737,357
Int. Cl. A61k 27/00
U.S. Cl. 424—156    4 Claims

ABSTRACT OF THE DISCLOSURE

Novel aspirin solubilizing agents comprising co-forms of magnesium and calcium carbonate or hydroxy carbonate are prepared from magnesium hydroxide and calcium hydroxide. Compositions containing aspirin combined with co-forms of magnesium and calcium carbonate or hydroxy carbonate.

CROSS REFERENCES TO RELATED APPLICATIONS

This application is a continuation-in-part of our copending application, Ser. No. 651,687, filed July 7, 1967, now abandoned.

BACKGROUND OF THE INVENTION (1) Field of the invention

This invention pertains to novel aspirin solubilizing compositions consisting of co-forms of magnesium calcium carbonate or magnesium calcium hydroxy carbonate, methods for producing the solubilizing agent, and aspirin, compositions containing the novel solubilizing agent.

(2) Description of the prior art

Aspirin has been long recognized as an effective analgesic and antipyretic when administered systemically. It has also been recognized that the absorption of aspirin is delayed when administered orally because of its low solubility in the acid, gastric fluids. The addition of a buffering or solubilizing agent to an aspirin formulation has been shown to be effective in enhancing the dissolution rate of aspirin, and hence increasing the absorption rate of aspirin. The function of the buffering agent is to increase and sustain local pH levels in the gastro intestinal tract at which the aspirin is more soluble. Thus, maintaining a favorable local pH environment leads to fast dissolution and more rapid absorption of aspirin in the gastro intestinal tract.

Heretofore buffered aspirin compositions have been prepared by utilizing such buffering agents alone or in combination as magnesium carbonate, dihydroxy aluminum glycinate, or glycine. In addition, effervescent buffered aspirin containing combination of sodium or potassium bicarbonate, citric acid or sodium citrate, and mono-calcium phosphate or sodium biphosphate as buffering agents have long been known.

Although the prior art buffered aspirin combinations have been shown to increase the dissolution rate of aspirin, certain undesirable properties have also been noted. For example, the effervescent buffered analgesic combinations can cause alkalosis or acid rebound, whereas aspirin combinations containing only calcium compounds can cause constipation, and aspirin combinations containing only magnesium compounds tend to have a laxative effect.

The novel aspirin solubilizing agents prepared according to the present invention are useful for preparing aspirin combinations which not only have enhanced solubility rates, but have the additional advantage of eliminating the undesirable properties of the prior art combinations. For example, the buffering agents of the present invent do not raise the pH of the gastric fluids to a point sufficient to cause alkalosis or acid rebound, and the presence of the magnesium ion tends to offset the constipating effect of the calcium ion.

SUMMARY OF THE INVENTION

It is an object of the present invention to provide novel aspirin solubilizing agents, said agents comprising co-forms of magnesium and calcium carbonate or hydroxy carbonate containing varying ratios of magnesium and calcium. It is another object of the present invention to provide a method for preparing these novel co-forms. A further object is provision of aspirin compositions in which magnesium and calcium carbonate or hydroxy carbonate are present in order to increase the solubility of aspirin.

In accordance with the present invention it has been discovered that a superior aspirin solubilizing agent is obtained from readily available magnesium and calcium hydroxide starting materials. The novel solubilizing agents of the present invention are co-forms of magnesium and calcium carbonate or hydroxy carbonate, containing when expressed as the oxide, varying ratios of MgO and CaO, and may be represented by the formula $$(X)MgO:(Y)CaO$$

wherein X and Y each represent an integer of 1–5.

Thus, the magnesium calcium carbonate or hydroxy carbonate compositions of this invention are co-formed products, obtained from calcium and magnesium hydroxide in a manner to be described hereafter, containing mole ratios of MgO:CaO ranging from 1:5 to 5:1, and hereafter will be referred to as magnesium calcium carbonate or hydroxy carbonate 1:1, 2:1, 3:1, 5:1, etc.

Although all of the co-forms having the molar proportions stated above are effective solubilizing agents for aspirin, those wherein X is the larger of the two integers are preferred. An especially useful solubilizing agent is a co-form of magnesium calcium carbonate or hydroxy carbonate wherein the MgO:CaO ratio is 3:1.

The co-forms of the present invention are prepared by intimately blending an aqueous slurry of magnesium hydroxide with an aqueous slurry of calcium hydroxide, each slurry containing sufficient magnesium and calcium hydroxide to yield the co-form having the MgO and CaO content desired. The co-slurry thus formed is then carbonated using carbon dioxide until a pH ranging from about 6.5–9.5 is obtained, although it is preferred that the co-slurry have a final pH of about 7.5–8.5. The carbonated co-slurry is then aged at room temperature for a period of about 20–30 hours, preferably 24 hours, and then heated at 65–85° C. for about 1–4 hours. By heating in this manner the co-form which is in crystalline needle form is expanded; that is to say the crystalline needles are expanded to an amorphous form. Alternativevly, the co-slurry after carbonation may be expanded first and then aged. During the expansion step the solids content (the total oxides) in the co-slurry should be about 1–5% but preferably less than 3%. The solids are then removed from the slurry by filtration, settlement, centrifugation, etc., washed with water to remove soluble impurities, and then diluted with water to a workable consistency, after which the material is then dried by conventional methods, such as spray drying, air drying or belt drying, wherein the product may be extruded such as by passing through an extruder, and subdivided into granular forms.

When preparing the magnesium calcium hydroxycarbonate co-forms of the present invention, only the calcium hydroxide slurry is subjected to carbonation; that is to say the aqueous slurry of calcium hydroxide is carbonated to a pH of about 4.5 to 6.5, preferably about 5, prior to being blended with the magnesium hydroxide slurry. The resulting co-slurry is then aged, filtered, washed and dried as described above, the expansion step being omitted. As used herein the term "aqueous slurry' is meant to be inclusive of compositions ranging in consistency from that of a thick paste to that of dilute slurries. The actual water content of the starting compositions may be adjusted to provide a mixture which is conveniently handled, considering the process difficulties in blending, handling, and pumping thick pastes against the economic disadvantage in using dilute slurries. The co-form thus obtained is a dry powder or a granular form. The term "dry powder" is meant to apply to that state at which the composition is dry, powdery and free-flowing, and does not mean that the combined water is completely or partially absent.

Alternatively, the magnesium calcium carbonate co-form may also be prepared by reacting a solution containing magnesium chloride and calcium chloride with an excess of sodium carbonate solution, the resulting co-precipitate is then expanded by heating, filtered, washed and dried in the manner described above.

Another embodiment of this invention is the provision of novel compositions containing the solubilizing agents disclosed herein, combined with aspirin. More specifically, the novel solubilizing agents of the present invention may be combined with aspirin whereby there is obtained a form of aspirin having enhanced solubility properties. The unit dosage form may be prepared by combining co-forms of magnesium and calcium carbonate or hydroxy carbonate with the aspirin and compressing into tablets; preferably, a two-layer tablet may be prepared where the aspirin is contained in one layer and the solubilizing agent in the other layer. Also encompassed within the scope of this invention are compositions which can be administered in powder form, that is, the solubilizing agent and the aspirin are physically mixed but not compressed into tablets, or the aspirin or the soluibilizing agent in powdered form are administered separately at the same time. When the aspirin compositions of this invention are prepared in tablet form, they will usually contain in addition to the aspirin and the solubilizing agent, diluents such as starch and/or gelatin or any other pharmaceutically acceptable granulating agent, which may act as bulk expanders to aid in the disintegration of the tablet upon administration, or aid in the compression of the tablet. The novel compositions the subject of this invention, in addition to aspirin, the solubilizing agent and the inert ingredients noted above, may also contain a second active ingredient such as caffeine or a barbiturate. Although the aspirin compositions of this invention may contain magnesium calcium carbonate or hydroxy carbonate in various ratios to effectively increase the solubility and hence the absorption rate, a preferred aspirin solubilizing composition is one that contains in addition to aspirin, magnesium calcium carbonate co-form having a MgO:CaO ratio of 3:1.

EXAMPLE 1

Magnesium calcium carbonate co-form 2:1

18.6 moles (5.59 kg.) of a 13.4% magnesium hydroxide slurry and 9.5 moles (13.05 kg.) of a 4.06% calcium hydroxide slurry are combined. The co-slurry is agitated for a short time to effect complete mixing. The mixture is then carbonated using dry $CO_2$ for a period of about four hours or until the pH=7.5. After allowing the material to age for about twenty-four hours, the co-slurry can be expanded either by heating at 65–70° C. for four hours, or heating to 85° C. and maintaining this temperature for one hour. After stirring for a period of time, the slurry is filtered, washed and repulped to the original volume. The material is then spray dried to a product which is a white, free flowing powder consisting of a co-form of magnesium calcium carbonate having a MgO:CaO ratio of 2:1.

EXAMPLE 2

Magnesium calcium carbonate co-form 3:1

A solution containing 0.98 mole (200.0 g.) of $MgCl_2 \cdot 6H_2O$ and 0.33 mole (48.2 g.) of $CaCl_2 \cdot 2H_2O$ in 500 ml. of water is reacted with a solution containing 1.37 moles (170 g.) of $Na_2CO_3 \cdot H_2O$ in 1,000 ml. of water. The resulting slurry is expanded at 70° C., filtered, washed and repulped to the original volume. Upon spray drying the product is a white, free-flowing powder consisting of a co-form of magnesium calcium carbonate having a MgO:CaO ratio of 3:1.

EXAMPLE 3

Magnesium calcium hydroxycarbonate co-form 3:1

10.33 moles (14.1 kg.) of a calcium hydroxide slurry (4.1% CaO) is carbonated for four hours. At this point the pH of the slurry is 5.0. This slurry is then agitated for sixteen hours. At this point 31.0 moles (10.7 kg.) of a magnesium hydroxide slurry (11.7% MgO) is co-slurried with the carbonated material and the co-slurry is diluted with deionized water. After a period of aging the slurry is filtered, washed, repulped and spray dried. The product is a white, rather dense, free flowing powder consisting of a co-form of magnesium calcium hydroxycarbonate having a ratio of 3:1.

EXAMPLE 4

Magnesium calcium carbonate co-form 3:1 granules 2.91 kg. of a magnesium hydroxide slurry (24.95% MgO, 18 moles) and 17.13 kg. of a slaked lime slurry (2.14% CaO, 6 moles) are combined and agitated until complete mixing is effected. The resulting co-slurry is then carbonated with carbon dioxide to a pH of 8.0. The co-slurry is then expanded by heating to 85°, and maintaining this temperature for 1 hour. The co-slurry is then aged for about 16 hours and then filtered, washed and the cake obtained is homogenized to form a fluid paste. The thick paste is then passed through an extruder and dried for about 12 hours at 100° C. The dried extrusions are then broken into about ½ to 1 inch sticks.

When the above procedure is repeated using 4.94 kg. (16.3% MgO, 20 moles) of magnesium hydroxide slurry and 7.74 kg. (2.9 CaO, 4 moles) of slaked lime slurry, there is obtained a granular form of magnesium calcium carbonate 5:1.

The relative amount of solubilizing agent which may be combined with the aspirin will range from about 50–350 mg. per about 300 mg. of aspirin, although 100 to 150 mg. per 300 mg. of aspirin is preferred. The formulation into the desired unit dosage form may be effected by methods known in the art. The type of diluent is not critical and will depend to some extent on whether a mixed compressed tablet or a compressed two-layer tablet is desired.

The following represent typical aspirin compositions containing the solubilizing agents of the present invention:

| | Per tablet, mg. |
|---|---|
| Magnesium calcium carbonate 2:1 | 146.0 |
| Aspirin containing 10% starch | 361.0 |
| Magnesium calcium carbonate 2.8:1 | 146.0 |
| Aspirin containing 10% starch | 361.0 |
| Magnesium calcium hydroxy carbonate 1:1 | 146.0 |
| Aspirin containing 10% starch | 361.0 |
| Magnesium calcium hydroxy carbonate 3:1 | 146.0 |
| Aspirin containing 10% starch | 361.0 |
| Magnesium calcium hydroxy carbonate 2.8:1 | 146.0 |
| Aspirin containing 10% starch | 361.0 |
| Magnesium calcium carbonate 5:1 | 50.0 |
| Aspirin containing 10% inert diluent | 335.0 |
| Magnesium calcium carbonate 3:1 | 350.0 |
| Aspirin containing 10% inert diluent | 361.0 |

What is claimed is:
1. A process for producing an aspirin solubilizing composition containing magnesium calcium hydroxy carbonate co-form having the molar composition when expressed as the oxides, (X)MgO:(Y)CaO, wherein X and Y each represent an integer of from 1–5, which comprises the steps of
  (a) carbonating an aqueous slurry containing calcium hydroxide with carbon dioxide until a pH of 4.5–6.5 is obtained;
  (b) intimately blending said carbonated slurry with an aqueous slurry of magnesium hydroxide, the relative amounts of said slurries being sufficient to provide adequate amounts of magnesium hydroxide and calcium hydroxide to yield in the co-formed product the molar amounts of magnesium oxide defined in said molar composition;
  (c) aging the resulting co-slurry at room temperature for about 20–30 hours;
  (d) separating the solids and washing and drying the solids obtained thereby.

2. The process according to claim 1 wherein X is 3 and Y is 1.

3. A process for producing a co-formed aspirin solubilizing composition containing magnesium calcium carbonate co-form having the molar composition when expressed as the oxides (X)MgO:(Y)CaO, wherein X and Y each represent an integer of from 1–5 which comprises the steps of
  (a) intimately blending an aqueous slurry of magnesium hydroxide and an aqueous slurry of calcium hydroxide, the relative amounts of said slurries being sufficient to provide adequate amounts of magnesium hydroxide and calcium hydroxide to yield in the co-formed product the molar amounts of magnesium oxide and calcium oxide defined in said molar composition;
  (b) carbonating the co-slurry so formed with carbon dioxide until a pH of 6.5–9.5 is obtained;
  (c) aging the resulting co-slurry at room temperature for about 20–30 hours;
  (d) heating said co-slurry at about 65–85° C. for about 1–4 hours to expand the material;
  (e) separating, washing and drying the solids obtained thereby.

4. The process according to claim 3 wherein X is 3 and Y is 1.

References Cited
UNITED STATES PATENTS

| | | | |
|---|---|---|---|
| 1,486,002 | 3/1924 | Alsleben | 424—157 |
| 2,158,091 | 5/1939 | Stevens | 424—230 |
| 2,224,256 | 12/1940 | Doushkess | 424—230 |
| 2,362,386 | 11/1944 | Lipschitz | 424—156 |
| 2,453,446 | 11/1948 | McGeorge et al. | 424—156 |
| 3,164,519 | 1/1965 | Puetzer et al. | 424—156 |

STANLEY J. FRIEDMAN, Primary Examiner

U.S. Cl. X.R.

424—157, 230